T. H. WHELESS.
INTERNAL COMBUSTION ENGINE TURBINE.
APPLICATION FILED NOV. 9, 1916.

1,300,903.

Patented Apr. 15, 1919.
4 SHEETS—SHEET 1.

Inventor
Thomas H. Wheless,
By his Attorneys

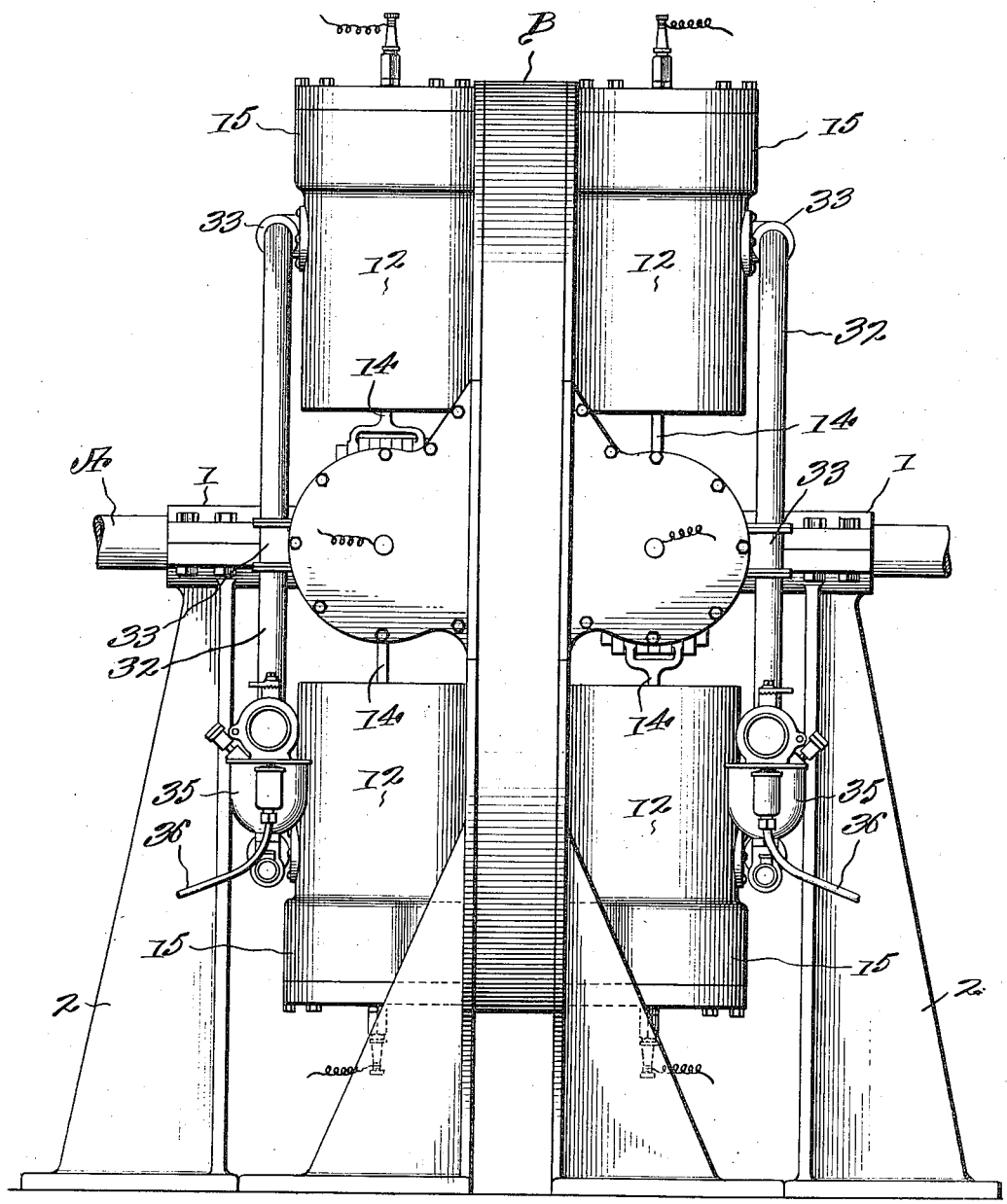

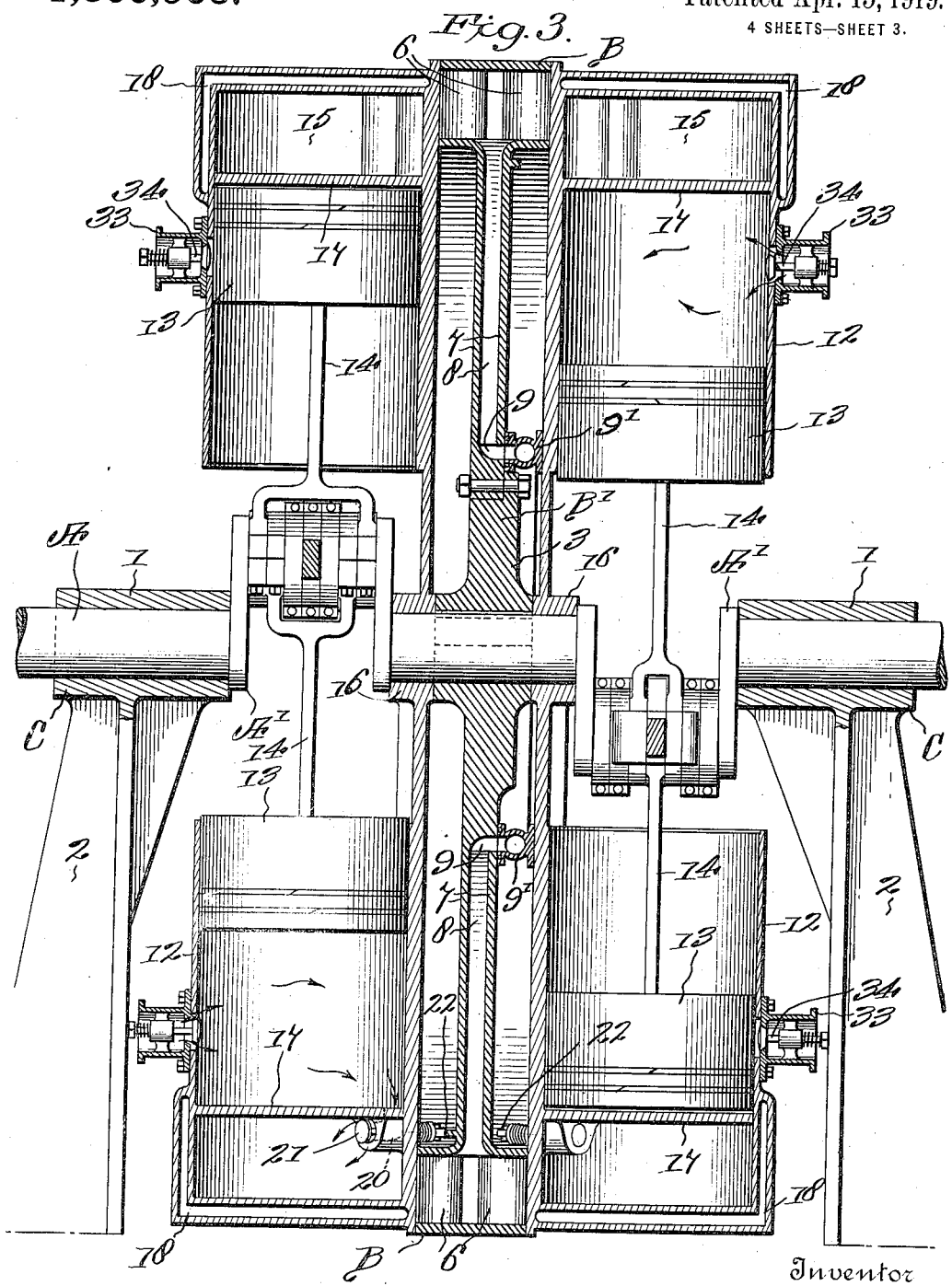

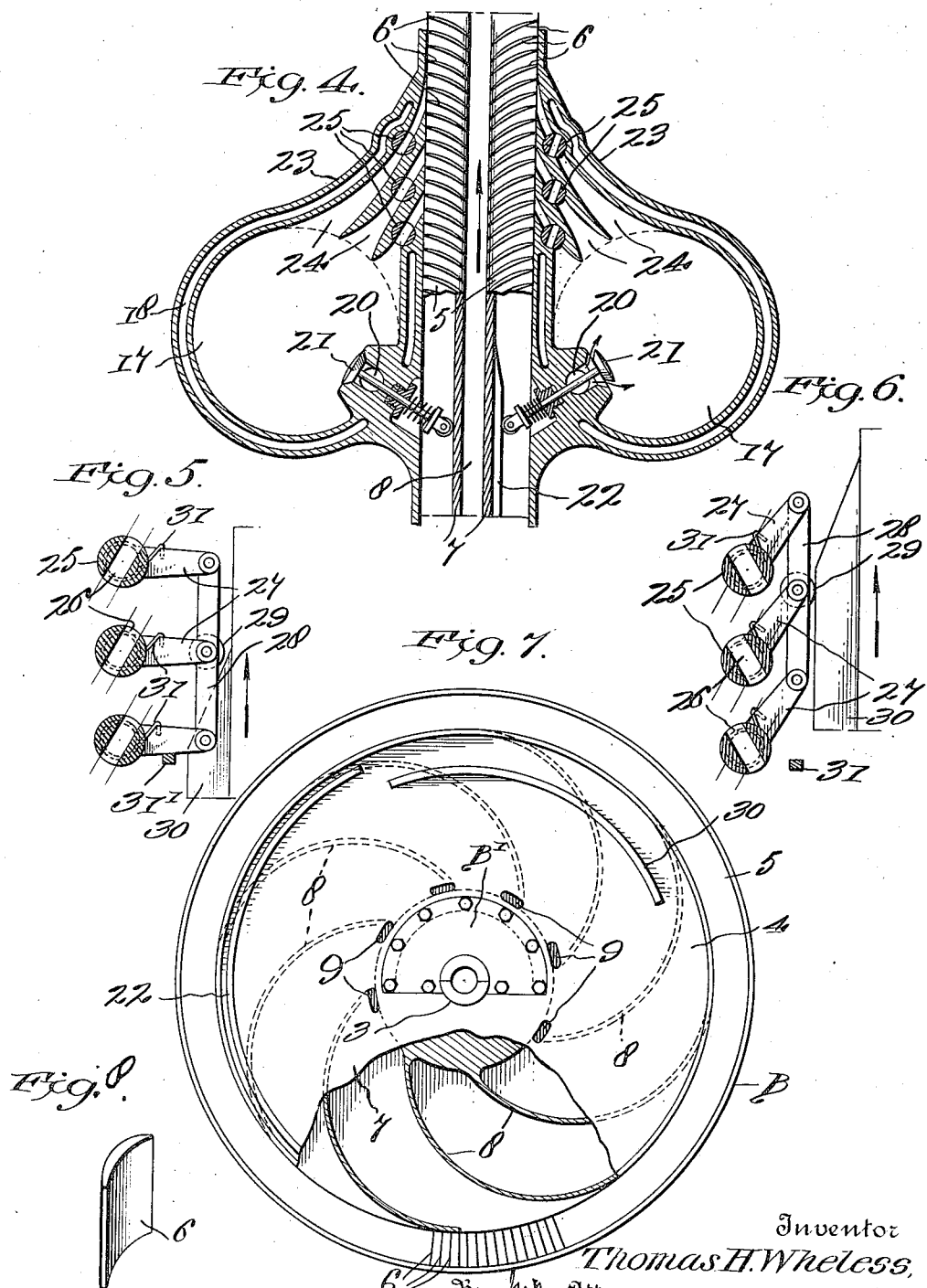

UNITED STATES PATENT OFFICE.

THOMAS H. WHELESS, OF NEWARK, NEW JERSEY.

INTERNAL-COMBUSTION-ENGINE TURBINE.

1,300,903.   Specification of Letters Patent.   Patented Apr. 15, 1919.

Application filed November 9, 1916. Serial No. 130,413.

*To all whom it may concern:*

Be it known that I, THOMAS HENRY WHELESS, a citizen of the United States, residing at Newark, in the county of Essex and State of New Jersey, have invented certain new and useful Improvements in Internal-Combustion-Engine Turbines; and I do hereby declare the following to be a full, clear, and exact description of the invention, such as will enable others skilled in the art to which it appertains to make and use the same.

This invention relates to certain new and useful improvements in hydrocarbon engines of the rotary type, and has for its general object, to utilize the force from a single explosive charge against a plurality of movable elements for the transmission of power.

Another object of the invention is, to provide a means for directing a succession of separate explosive charges against a plurality of vanes mounted on a rotating member.

A further object of the invention is, to simplify the construction and operation of rotary gas engines by reducing to a minimum the number of working parts, so as to increase the efficiency and decrease the cost of operation.

To these ends, the invention consists in the novel details of construction and combination and arrangement of parts hereinafter described.

Reference is had to the accompanying drawings in which similar parts are indicated by similar reference symbols throughout the several views.

Fig. 2 is a side elevation;

Fig. 3 shows an enlarged vertical cross section taken through the central portion of the engine;

Fig. 4 shows a horizontal cross section taken on the line 4—4 of Fig. 1;

Figs. 5 and 6 show horizontal cross sections of the nozzle valves showing the valves in the operative and inoperative positions, and the means for shifting same;

Fig. 7 is a side elevation of the rotor, parts broken away for the sake of clearness; and, Fig. 8 is a detailed perspective view of one of the vanes of the rotor.

Figure 1:
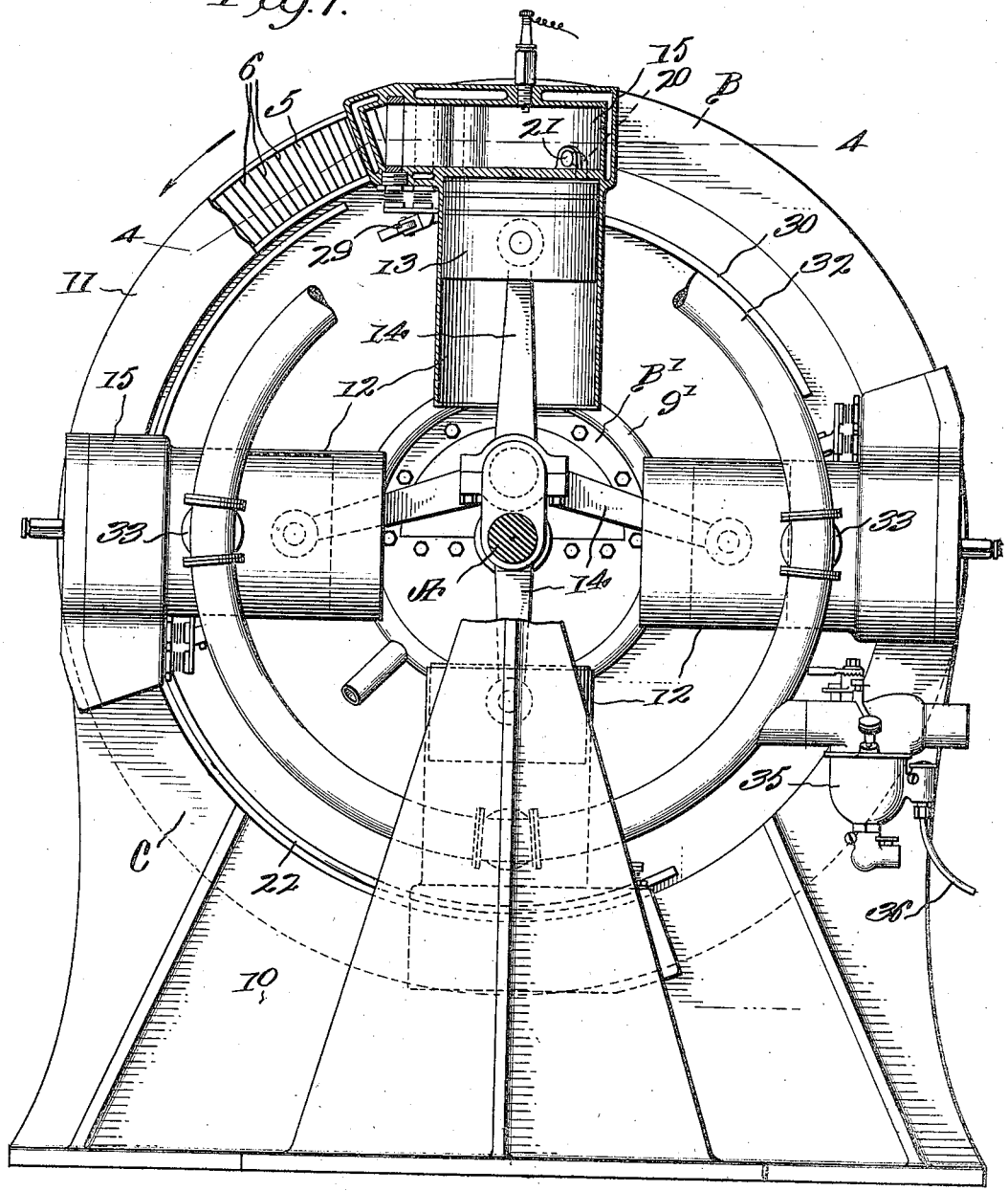
Figure 1 is an end elevation of my improved engine, with parts broken away and parts shown in section, for the sake of clearness.

Referring now to the construction in detail, A represents a rotating crankshaft on which is mounted the rotor B; and C designates a stator mounted adjacent to the rotor and supported upon a suitable base.

The crankshaft A has its outer ends mounted in bearings 1, which are arranged on the upper ends of the supports 2.

The rotor is fast on the crankshaft and comprises the hub portion 3, a web portion 4 and a rim portion 5.

A plurality of vanes 6 are mounted in the rim of the rotor at the opposite sides thereof. These are angularly arranged with relation to the sides of the rotor so as to present their faces, which may be concave, as shown in Fig. 8, if desired, at substantially right angles to the line of explosive force.

The web 4 of the rotor comprises the sides 7 between which are provided a plurality of curved and radially disposed ribs 8 for centripetally exhausting the spent gases; and 9 designates a series of exhaust outlet openings arranged in one side of the web through which the exhaust gases are directed to the exhaust manifold 9', which manifold is secured in any suitable manner to the stator.

For convenience in mounting the rotor on the crankshaft, I provide a detachable sector B', see Figs. 1 and 3, near the center thereof.

The stator is arranged on the opposite sides of the rotor and comprises a base portion 10 and a rim portion 11, on which are mounted a plurality of radially arranged cylinders 12. These cylinders are respectively mounted in a single radial plane and are provided with pistons 13 which by means of rods 14 are connected to the crank A'.

As shown in Fig. 3, the stator is also provided with bearings 16 on opposite sides of the rotor for the crankshaft A.

The outer end of each of the cylinders 12 is provided with an explosion chamber 15 which is separated from the interior of the cylinder by the division plate or web 17.

These explosion chambers are surrounded by a water jacket 18, see Fig. 3, which may be connected to a suitable water circulating system, not shown.

As illustrated in the drawings, the stator is at both sides of the rotor, and each group of cylinders is respectively arranged in a single radial plane that is parallel to the sides of the rotor.

Each explosion chamber 17 is in communication with the cylinder 12 by means of an opening 20 (see Figs. 3 and 4) which opening is normally closed by means of a spring impressed valve 21. This valve is preferably located in the explosion chamber and is arranged to be actuated by means of a cam 22 mounted on the side of the rotor.

Through the valve opening 20 a charge of gas under compression is directed into the explosion chamber upon the outward stroke of the piston; the valve being normally timed and held in its open position by the cam 22 during the compression stroke.

23 designates extensions at the outer ends of the cylinders which are provided with nozzles communicating with the explosive chamber, through which the explosive charge is directed against the vanes of the rotor. These nozzles are provided with a plurality of outlets 24 controlled by a series of rotary nozzle valves 25. These valves are each provided with an outlet opening 26 and are rocked by arms 27, pivotally connected to the bar 28, on which is mounted a roller 29. This roller engages the cam 30 mounted on the side of the rotor, for normally closing and maintaining the valve in a closed position for the proper length of time.

After the cam 30 has passed beyond the roller 29, the valves are brought to the open position by means of the coil springs 31 surrounding the stems of the valves and engaging the arms 27. Any other suitable spring arrangement for returning the nozzle valves to the initial position may be adopted.

A stop lug 31', see Figs. 5 and 6, projects from the stator into the path of movement of one of the arms 27 so as to maintain the openings in the valves in their true alinement with the openings of the nozzles.

The nozzle openings are preferably arranged as shown in Fig. 4, so that the explosive force may be directed against the vanes of the rotor at substantially right angles, and in a line as nearly parallel as practicable to the face of the rotor.

32 designates an inlet manifold, or feed pipe, which is connected to each of the cylinders by means of the branch pipes 33, within which are mounted the spring actuated inlet valves 34. These valves are arranged to permit a charge of fuel to be sucked into the cylinder upon the return stroke of the piston, as clearly shown in Fig. 3.

Any suitable carbureter 35 is connected to the manifold for supplying the proper mixture thereto; and this carbureter is connected to any suitable source of fuel supply by means of the fuel feed pipe 36.

The operation of my engine is as follows:

Assuming that an explosive force has been directed against the vanes of the rotor, and the compression valve 21 has been closed, the operation of a single cylinder will now be described.

Upon the down stroke of the piston, a suction is created within the cylinder, and the manifold valve 34 is opened after the piston has passed its inlet port, as shown in Fig. 3; and thus drawing a charge of explosive mixture through the manifold valve into the cylinder.

Upon the compression, or return, stroke of the piston, the manifold valve 34 is closed, and the compression valve is opened by the cam 22 of the rotor. The opening of the compression valve permits the charge to be forced, under compression, through the valve opening 20 into the combustion chamber, the compression valve 21 being held in its open position until the compression stroke of the piston has been completed, when it is closed by the cam 22, passing from engagement therewith. Simultaneously with the opening of the compression valve, the nozzle valves 25 are closed, so as to confine the charge of fuel in the combustion chamber. The closing of these nozzle valves is effected simultaneously by means of the roller 29 engaging with the cam 30 mounted on the rotor, as shown in Fig. 6.

The charge is now ready for ignition, which takes place in the usual manner and occurs simultaneously with the opening of the nozzle valves 25. The exploded charge is then directed through the nozzle openings 24 against a plurality of the vanes of the rotor. The nozzle valves are timed so as to be held open a short interval of time to permit the exhaustion of the spent gases from the explosion chamber.

Upon the impact of the gas against the vanes of the rotor, the rotor is revolved in the direction of the arrow.

After the explosive charge has exerted its force against the vanes of the rotor, the exhaust gases are directed into the interior of the rotor where, by means of the exhaust ribs 8 of the rotor, they are centripetally forced to the exhaust manifold 9'.

Simultaneously with the ignition of the charge in the explosion chamber, and when the piston is at the end of its compression stroke, the piston radially opposed thereto will be at the end of its suction stroke and ready for the compression of a charge within its cylinder; and the operation as just described will be repeated.

By arranging the cylinders radially in series on the opposite sides of the rotor, and by connecting the pistons of each series to a single crank, as shown in Fig. 3, two explosive charges are directed against the vanes of the rotor during each quarter revolution thereof.

Having thus described my invention, what I claim and desire to secure by Letters Patent of the United States is:

1. In a rotary gas engine, the combination of a rotor provided with a series of radially arranged vanes on the opposite sides thereof and a stator provided with explosive chambers mounted on the opposite sides of the rotor and arranged for directing single explosive charges against a plurality of the vanes on said rotor, and means mounted on the rotor and arranged between the series of vanes for centripetally exhausting the gases, substantially as described.

2. In an internal combustion engine, the combination with a rotor provided with vanes, of a stator having an explosion chamber at each side of said rotor, said chambers being provided with a plurality of outlets leading to opposite sides of the rotor whereby to make each single charge exploded in said chambers simultaneously felt at different successive parts of the rotor, and a valve in each of said outlets, substantially as described.

3. In an internal combustion engine, the combination with a rotor provided with vanes, of two stators, one at each side of said rotor, each stator being provided with a plurality of explosion chambers, each of said chambers being provided with a plurality of outlets leading to opposite sides of said rotor and adapted to direct the charge exploded in each chamber simultaneously against a plurality of said vanes, a valve in each of said outlets, and means for actuating said valves.

4. In an internal combustion engine, the combination of a rotor provided with vanes, of a stator at both sides of said rotor, each stator having an explosion chamber, said chambers having each a plurality of outlets, the outlets of one stator leading to one side and the outlets of the other stator leading to the opposite side of the rotor, and exhaust means included in said rotor for centripetally exhausting the spent gases, substantially as described.

5. In a hydrocarbon engine, the combination with a rotor having vanes, of a stator having a combustion chamber provided with a plurality of outlets for directing a single exploded charge against a plurality of vanes, valves one in each of said outlets, means connecting said valves for simultaneous operation, a part moving with said valves and connecting means, and a second part carried by said rotor and adapted to encounter said first-named part to actuate the valves, substantially as described.

6. In an internal combustion engine, the combination with a rotor provided with vanes, of a stator at each side of said rotor, each stator having a plurality of explosion chambers, each chamber having a plurality of outlets leading to said vanes, a valve in each outlet, means connecting together the set of valves common to each chamber, a part moving with each set of valves and connecting means, and a part on each side of said rotor for succesively engaging the first-named parts whereby to open the valves, substantially as described.

7. In a rotary gas engine, the combination of a rotor provided with a series of vanes, a stator comprising a double series of cylinders, one series arranged on each side of said rotor, each of said cylinders being provided with an explosion chamber arranged for directing the charge ignited therein against the vanes on said rotor, and means mounted on said rotor for centripetally exhausted spent gases, substantially as described.

8. In a rotary gas engine, the combination of a rotor provided with a series of radially arranged vanes; a stator comprising a double series of cylinders arranged in parallel planes on each side of said rotor, each cylinder being provided with an explosion chamber arranged for directing a single explosive force against a plurality of vanes on said rotor, and means mounted on the rotor for centripetally exhausting the gases, substantially as described.

9. In a rotary gas engine, the combination of a rotor having vanes for receiving an exploded charge, an explosion chamber, a pump for receiving a supply of gas and delivering and compressing such gas into the explosion chamber, a valve situated between said pump and explosion chamber, means on said rotor for opening said valve, a plurality of outlets leading from said explosion chamber to the vanes of said rotor, a valve in each of said outlets, means for normally maintaining said last-named valves closed, and coöperating means arranged on said outlet valves and rotor for opening said valves, substantially as described.

10. In a rotary gas engine, the combination of a rotor provided with two series of separated vanes having a space therebetween to receive the exhaust gases, means at both sides of said rotor for delivering driving charges thereto, and a plurality of curved radially disposed ribs carried on said rotor and leading from the space between said vanes to the central part of said rotor for centripetally exhausting the spent gases, substantially as described.

11. In an internal combustion engine the the combination with a rotor provided with vanes, of a pair of stators each stator being provided with a plurality of explosion chambers, each of said chambers being provided with a plurality of outlets whereby to direct the explosive gases against a plurality of said vanes, and a series of spring impressed valves controlling said outlets, and an arc shaped cam rib carried by said rotor for lifting said valves against the action of said springs, substantially as described.

12. In a rotary gas engine, the combination of a rotor provided with a series of radially arranged vanes, and a stator comprising a double series of cylinders arranged in parallel planes on each side of said rotor, each cylinder being provided with an explosion chamber arranged for directing a single explosive force against a plurality of vanes on said rotor, a carbureter, a manifold receiving the explosive mixture from said carbureter and connected to each of said cylinders, a series of admission valves controlling the passage of the explosive mixture from said manifold to said cylinders, compression valves controlling the flow of fluid from said cylinders to said explosion chambers, and means operated by said rotor for controlling said compression valves, substantially as described.

13. In a rotary gas engine, the combination of a rotor provided with a series of radially arranged vanes; a stator comprising a double series of cylinders arranged in parallel planes on each side of said rotor, said cylinder being provided with an explosion chamber arranged for directing a single explosive force against a plurality of vanes on said rotor, means mounted on the rotor for contripetally exhausting the gases, a carbureter, a manifold receiving the explosive mixture from said carbureter and connected to each of said cylinders, a series of admission valves controlling the passage of the explosive mixture from said manifold to said cylinders, compression valves controlling the flow of fluid from said cylinders to said explosion chambers, and means operated by said rotor for controlling said compression valves, substantially as described.

14. In a rotary gas engine, the combination of a rotor provided with a series of radially arranged vanes, and a stator comprising a double series of cylinders arranged in parallel planes on each side of said rotor, each cylinder being provided with an explosion chamber arranged for directing a single explosive force against a plurality of vanes on said rotor, a carbureter, a manifold receiving the explosive mixture from said carbureter and connected to each of said cylinders, a series of admission valves controlling the passage of the explosive mixture from said manifold to said cylinders, compression valves controlling the flow of fluid from said cylinders to said explosion chambers, and arc shaped cams carried by said rotor for controlling said compression valves, substantially as described.

15. In a rotary gas engine, the combination of a rotor provided with a series of radially arranged vanes; a stator comprising a double series of cylinders arranged in parallel planes on each side of said rotor, each cylinder being provided with an explosion chamber arranged for directing a single explosive force against a plurality of vanes on said rotor, means mounted on the rotor for centripetally exhausting the gases, a carbureter, a manifold receiving the explosive mixture from said carbureter and connected to each of said cylinders, a series of admission valves controlling the passage of the explosive mixture from said manifold to said cylinders, compression valves controlling the flow of fluid from said cylinders to said explosion chambers, and arc shaped cams carried by said rotor for controlling said compression valves, substantially as described.

In testimony whereof, I affix my signature.

THOMAS H. WHELESS.